(12) United States Patent
Reynolds et al.

(10) Patent No.: US 7,771,595 B2
(45) Date of Patent: Aug. 10, 2010

(54) FILTER ELEMENT WITH FLOW DIRECTING END CAP

(75) Inventors: Anita L. Reynolds, Temperance, MI (US); Albert F. Cella, Sylvania, OH (US); Bruce E. Shane, Delta, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 860 days.

(21) Appl. No.: 11/670,799

(22) Filed: Feb. 2, 2007

(65) Prior Publication Data

US 2007/0181481 A1 Aug. 9, 2007

Related U.S. Application Data

(60) Provisional application No. 60/771,611, filed on Feb. 9, 2006.

(51) Int. Cl.
*B01D 27/00* (2006.01)
*B01D 35/22* (2006.01)
*B01D 29/90* (2006.01)

(52) U.S. Cl. ............ 210/232; 210/304; 210/440; 210/444; 210/450; 210/306

(58) Field of Classification Search ............. 210/232, 210/304, 306, 440, 444, 450
See application file for complete search history.

(56) References Cited

U.S. PATENT DOCUMENTS

| | | | |
|---|---|---|---|
| 2,055,180 A | 9/1936 | Nelson | |
| 2,995,253 A | 8/1961 | Belgarde et al. | |
| 3,256,989 A | 6/1966 | Hultgren | |
| 4,721,563 A | 1/1988 | Rosaen | |
| 5,114,572 A * | 5/1992 | Hunter et al. | 210/120 |
| 5,171,430 A | 12/1992 | Beach et al. | |
| 5,342,519 A | 8/1994 | Friedmann et al. | |

(Continued)

FOREIGN PATENT DOCUMENTS

DE 1 933 283 1/1971

(Continued)

OTHER PUBLICATIONS

Notification of Transmittal of the International Search Report and the Written Opinion of the International Searching Authority, or the Declaration in corresponding International Application No. PCT/US2007/002885.

*Primary Examiner*—Thomas M Lithgow
(74) *Attorney, Agent, or Firm*—Christopher H. Hunt

(57) ABSTRACT

A filter element includes a ring of filtration media circumscribing a central axis, and first and second end caps. The first end cap includes i) an annular body portion defining a central opening around the central axis, sealingly bonded to the first end of the media ring, ii) an annular sealing ring having an annular, peripheral resilient sealing portion; and iii) axial support stanchions around the periphery of the body portion. The stanchions support the sealing ring at a location spaced apart from the body portion, and define radial flow openings between adjacent stanchions. One or more non-radial flow members extend from each stanchion along the outer surface of the annular body portion to direct flow in a spiral or helical manner, where the flow then passes through the flow openings and downwardly along the outer surface of the media in a swirling manner.

21 Claims, 4 Drawing Sheets

U.S. PATENT DOCUMENTS

| | | |
|---|---|---|
| 5,681,461 A | 10/1997 | Gullett et al. |
| 5,779,903 A | 7/1998 | Smith et al. |
| 6,110,365 A * | 8/2000 | Bartels et al. ............... 210/232 |
| 6,187,191 B1 * | 2/2001 | Koivula et al. .............. 210/440 |
| 6,227,381 B1 * | 5/2001 | Koivula ...................... 210/440 |
| 6,423,225 B2 * | 7/2002 | Wong et al. ................. 210/304 |
| 6,761,822 B1 | 7/2004 | Rhyne et al. |
| 6,843,377 B1 | 1/2005 | Roll |
| 7,001,440 B1 * | 2/2006 | Chilton ....................... 55/337 |
| 7,232,035 B1 * | 6/2007 | Crawford et al. ............ 210/456 |
| 2007/0181481 A1 * | 8/2007 | Reynolds et al. ............ 210/304 |

FOREIGN PATENT DOCUMENTS

| | | |
|---|---|---|
| DE | 41 27 031 | 2/1993 |
| EP | 0771582 A1 | 5/1977 |
| WO | 9220425 | 11/1991 |
| WO | 95/00232 | 1/1995 |
| WO | 9715370 | 5/1997 |

* cited by examiner

FILTER ELEMENT WITH FLOW DIRECTING END CAP

CROSS-REFERENCE TO RELATED CASES

The present application claims the benefit of the filing date of U.S. Provisional Application Ser. No. 60/771,611; filed Feb. 9, 2006, the disclosure of which is expressly incorporated herein by reference.

FIELD OF THE INVENTION

The present invention relates to filter elements for fluids, and more particularly to replaceable filter elements for hydraulic fluids and lubricating oils which provide efficient separation of particles and other contaminants from a fluid stream.

BACKGROUND OF THE INVENTION

Replaceable filter elements are well known which can be located in a casing or housing and separate contaminants from a fluid stream. One such element is shown in Koivula, U.S. Pat. No. 6,187,191, which shows and describes a filter assembly, particularly for lubricating oil and hydraulic applications, that has a cup-shaped casing enclosing a replaceable element, and which can be "spun on" to a threaded joint of a device assembly. The casing includes a central perforated support pipe attached to an extension of a deep-drawn recess at the closed end of the casing, and projecting toward the open end. The element has a cylindrical shape with appropriate filter media, and a first annular end cap at one (lower) end that is received over and seals to the central support pipe. A joint ring bears against the open casing end and has flow openings for the incoming fluid stream. The element has an annular end cap at the other (upper) end, with an end flange with an outer annular edge that is received between and provides a seal between the casing opening and the joint ring. A central collar is sealing received within this end cap, and has a threaded interior to enable the element to be spun onto a threaded spud of the device assembly.

Radial flow openings in the upper end cap allow fluid flow through the flange to the outer periphery of the element, where the fluid then passes downward between the element and the casing. The fluid then passes radially inward through the media and perforated support pipe, and then axially upward and out through the collar to the device assembly. When the element becomes spent, the casing can be easily unscrewed from the device assembly, the joint ring removed from the casing, and the filter element removed and replaced. The components are then reassembled and spun back on the device assembly.

The filter assembly of Koivula provides a simple filter that is tightly sealed to the device assembly, and provides an instant notification (a visible leak) if a casing is replaced without an element installed.

While the Koivula filter has many advantages over prior designs, the radial flow openings in the flange of the upper end cap direct fluid downward, primarily in the axial direction along the outer surface of the element. This tends to cause the contaminants to agglomerate in the upper region of the element, and cause pressure drop there across, while the lower portion of the element is relatively clog-free. This uneven distribution of fluid and contaminants can lead to decreased performance, and reduced element life.

It is therefore believed there is a demand for an improved replaceable filter element for such applications that has lower initial pressure drop and increased contaminant-holding capacity, without significant overhaul or modification of the filter system.

SUMMARY OF THE INVENTION

The present invention provides a novel and unique filter element that has increased contaminant-holding capacity and can be used in such applications without overhaul or modification to the fluid system. The filter element of the present invention has an end cap structure at its upper end that causes fluid to flow helically or spirally across the outer surface of the end cap, and out through the radial flow openings. The fluid then passes downwardly, in a swirling manner, along the outer periphery of the element, between the element and casing, for an improved, even distribution of fluid and contaminants along the outer extent of the media. The present invention is particularly useful for removing particles and other contaminants from a hydraulic fluid or a lubricating oil stream, however it should be appreciated that the present invention is useful for a variety of liquids and other fluids in many applications.

The filter element of the present invention includes a ring of filtration media circumscribing a central axis, and first and second end caps at the opposite end of the media ring. The first (upper) end cap includes i) an annular body portion defining a central opening around the central axis, sealingly bonded to the first end of the media ring and having an inner seal for sealing against a post of the filter head, ii) an annular sealing ring having an annular, peripheral resilient sealing portion for sealing against and between the casing and the filter head; and iii) axial support stanchions around the outer periphery of the body portion. The support stanchions support the sealing ring at a location spaced axially apart from the body portion, and define radial flow openings between adjacent stanchions. At least one, and preferably a pair of non-radial flow members extend from each stanchion along an outer surface of the annular body portion to an annular flange bounding the central opening. The flow members direct flow received against the annular body portion of the first end cap in a spiral or helical manner outwardly through the flow openings whereupon the flow then passes along the outside surface of the element in a swirling (e.g., spiral or helical) manner.

Further features and advantages will be apparent upon reviewing the following Detailed Description of the Preferred Embodiment and the accompanying Drawings.

DETAILED DESCRIPTION OF THE PREFERRRED EMBODIMENT

Figure 1:
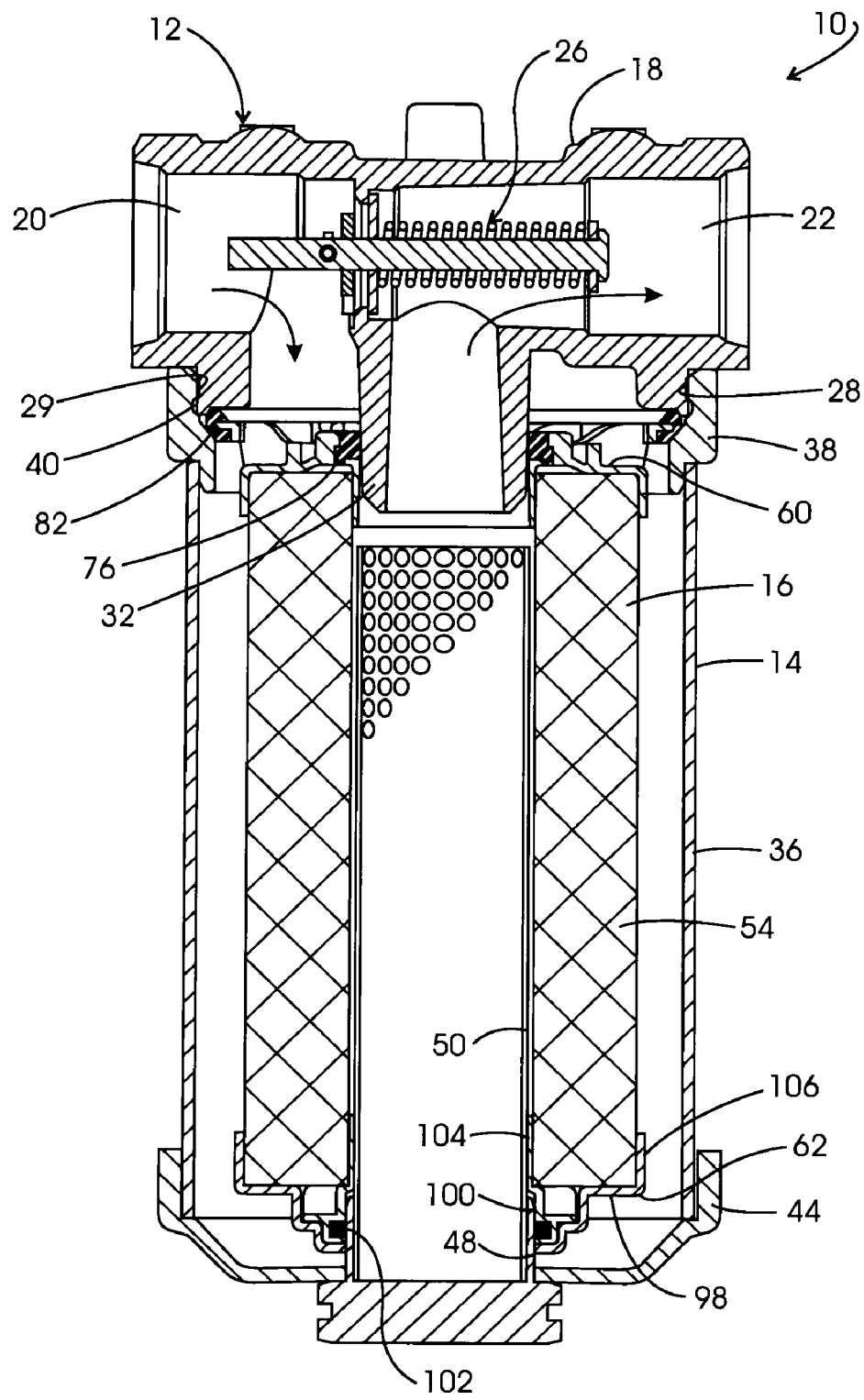
FIG. 1 is a cross-sectional side view of a filter assembly constructed according to the present invention.
Figure 2:
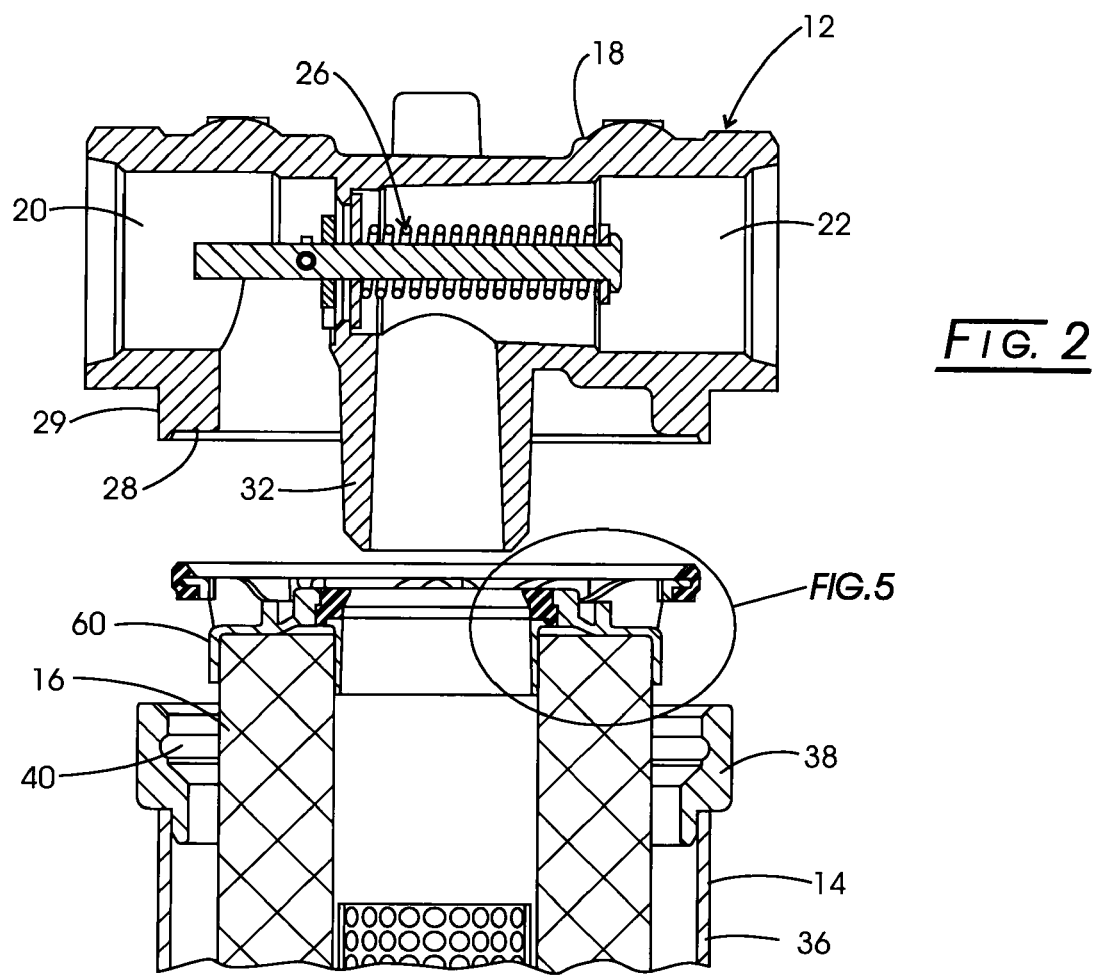
FIG. 2 is a cross-sectional side view of the filter assembly of FIG. 1, shown in partial, exploded view.

Referring to the drawings, and initially to FIGS. 1 and 2, a filter assembly constructed according to the present invention is indicated generally at 10. As should be appreciated, the filter assembly can be used for a variety of filtration applications, and is believed to be particularly useful for filtering hydraulic fluids and lubricating oils.

The filter assembly 10 includes a filter head, or other mounting device, indicated generally at 12; a casing or housing 14 which can be attached to the head; and a replaceable filter element 16, located and enclosed within the casing and head.

The head 12 is formed of a strong, rigid material appropriate for the application, such as metal, and includes a body 18 with inlet and outlet passages 20, 22. A valve assembly, indicated generally at 26, is typically provided to regulate flow between passages 20 and 22. Valve assembly 26 is normally closed, but opens to allow flow between the inlet and outlet passages when the fluid pressure across the element increases above a predetermined level, indicating a clogged filter element. An outer annular collar 28 depends axially from the periphery of the body 18 and includes an outer threaded portion 29. An inner annular post or spud 32, fluidly connected to the outlet passage 22, depends axially downward along the central axis of the head body. The post 32 has a smooth and continuous outer annular surface.

The casing 14 of the filter assembly is also formed of a strong, rigid material, such as metal, and includes an axially-extending outer shell 36; a ring or enlarged annular flange 38 at one upper (open) end, having an internal threaded portion 40 for engaging the threads 29 of the head; and an end cap 44 closing the opposite lower end of the shell. A central, solid, annular post 48 is provided with end cap 44, supporting an axially extending, elongated central perforated support tube 50 in the casing. Perforated tube 50 extends centrally within the casing to a distal end preferably slightly below the lower distal end of head post 32. Ring 38 and end cap 44 are formed integral with shell 36, such as by welding or brazing, or could be formed unitary, in one piece. Post 48 and tube 50 can be supported by and affixed to each other and to the end cap 44 in the same manner.

The filter element 16 of the assembly circumscribes the central axis and includes a ring of filtration media 54 of an appropriate material for the particular application. In one embodiment, the media comprises a micro glass media, available from the Hydraulic Filtration Division of Parker-Hannifin Corporation. The media in such embodiment is formed into axially extending pleats, and includes an outer polyester or nylon mesh wrap. A bead of adhesive is located around the outer peaks of the pleats to bond the outer wrap to the media material. However, it should be appreciated that the media can be other types of media material and can have other structures and functions, appropriate for the particular application.

Figure 3:
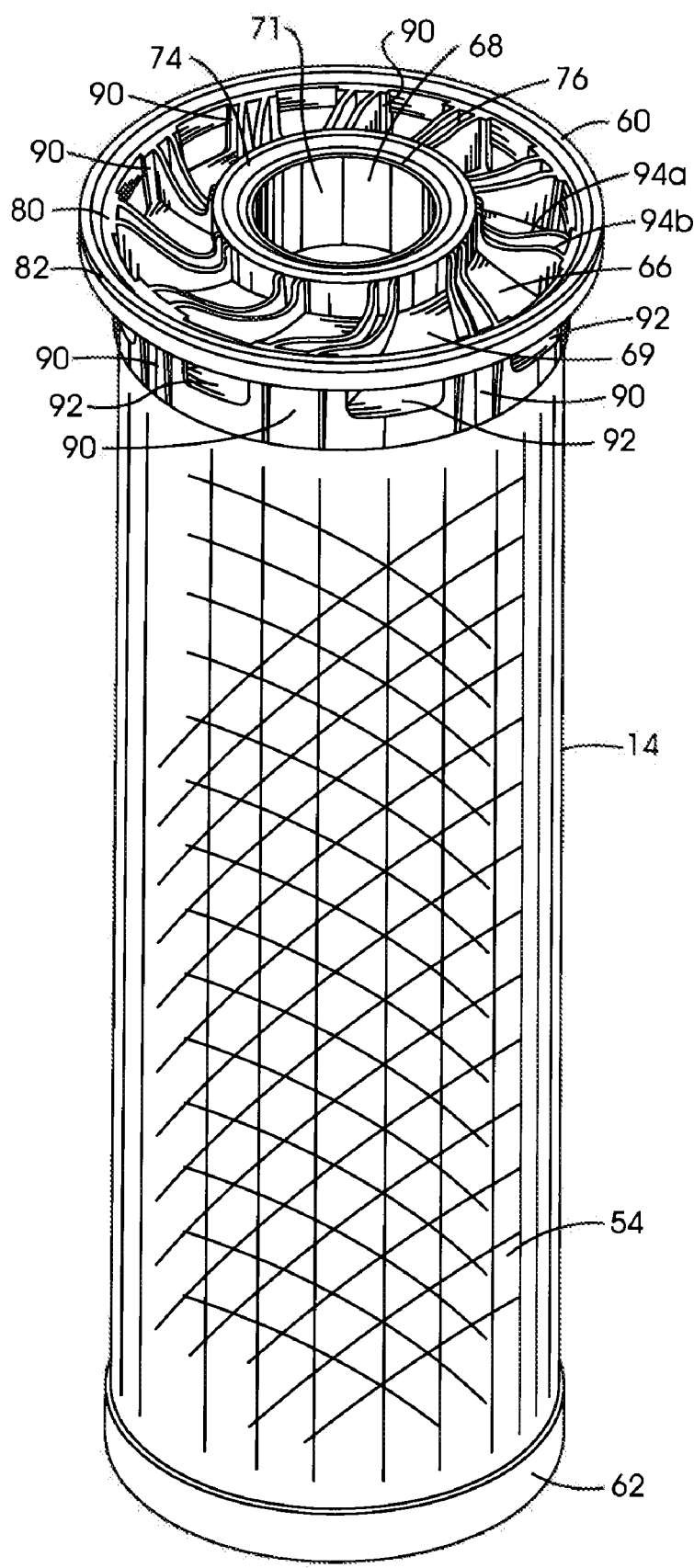
FIG. 3 is a side view in elevation, of the filter element for the assembly of FIG. 1.
Figure 4:
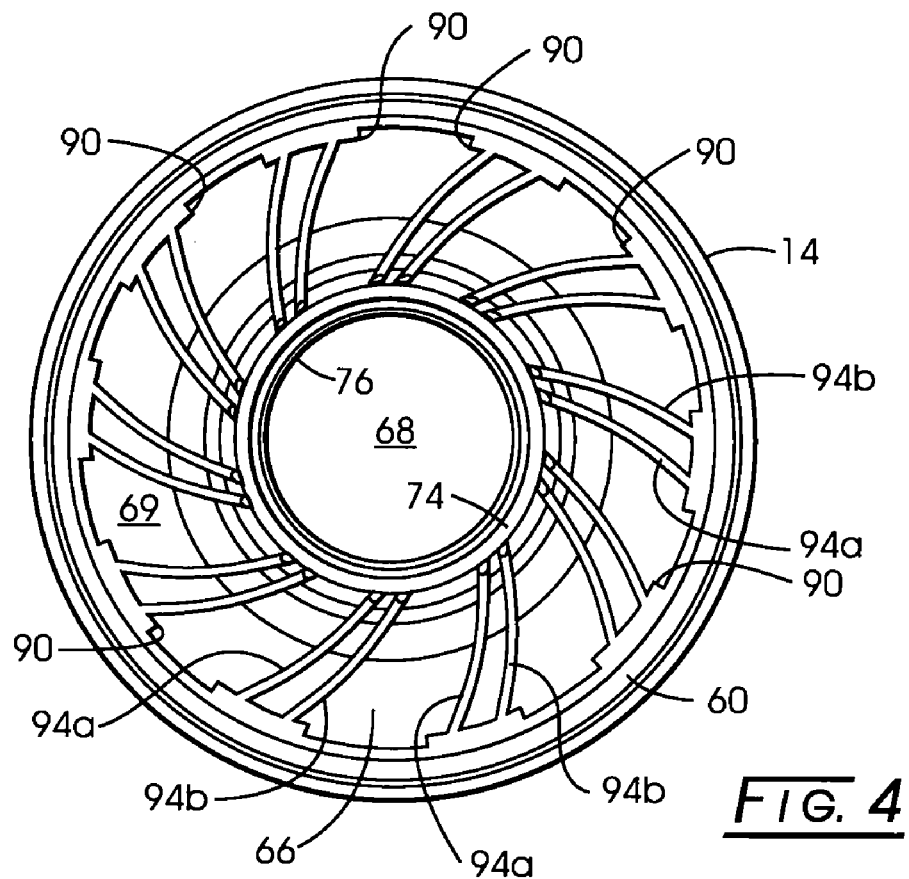
FIG. 4 is a top end view of the filter element of FIG. 3.
Figure 5:
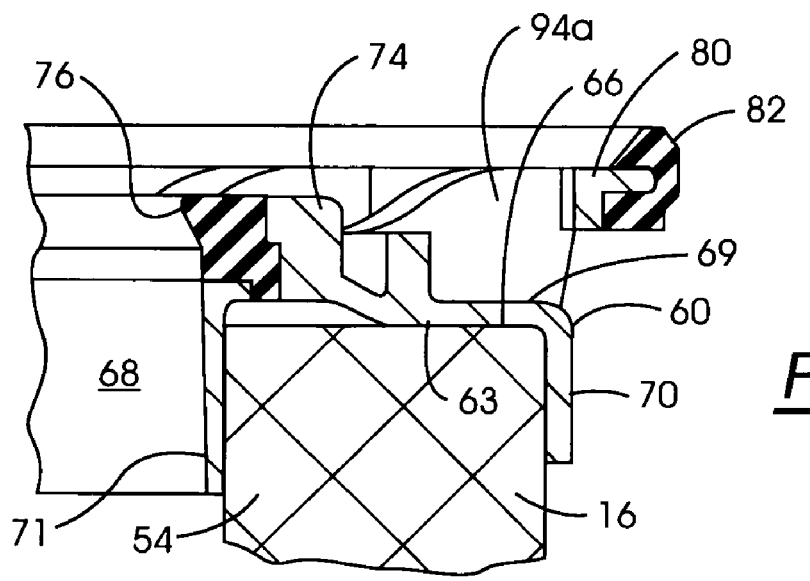
FIG. 5 is a cross-section, enlarged view of a portion of the element from FIG. 2.

The media ring 54 of the element has first and second ends, and first and second end caps 60, 62, affixed to the opposite ends of the media ring using appropriate adhesive or potting compound (as at 63). The end caps are also formed of an appropriate strong, rigid material, such as plastic or nylon, and as shown in FIGS. 3-5, the first (upper) end cap 60 includes a U-shaped (in cross-section) annular body portion 66 defining a central opening 68 around the central axis, and sealingly bonded to the first (upper) end of the media ring. The body portion 66 of the end cap has a substantially flat upper or outer surface 69 along a major portion of the body portion, an outer annular skirt 70 bounding the outer diameter which extends a short distance downwardly along the outer surface of the element, and an inner annular skirt 71 bounding the inner diameter which extends a short distance downwardly along the inner surface of the element. An annular flange 74 projects upwardly and outwardly from the upper surface 69 of the body portion, bounding the central opening 68. Flange 74 supports an annular inner seal 76, which is carried along a radially inner surface of the flange. Seal 76 is formed of resilient, preferably elastomeric material and is and bonded to the flange by appropriate means, such as by adhesive, fusion bonding, integral molding, etc. Seal 76 is dimensioned for sealing against the cylindrical post 32 of the filter head (as shown in FIG. 1).

An annular sealing ring 80 having an annular, peripheral resilient (preferably elastomeric) sealing member 82, is supported axially apart from the body portion 66, and has a slightly larger diameter than the body portion. Sealing member 82 preferably surrounds or encompasses the rim of the outer sealing ring 80 and is located for sealing against and between the casing 14 and the filter head 18 (as shown in FIG. 1).

The sealing ring 80 is supported relative to the body portion 66 by a series of axial support members or stanchions as at 90, which are located around the periphery of the body portion, flush with the outer skirt 70. The stanchions 90 support the sealing ring at a location spaced axially apart from the body portion, and define radial flow openings 92 between adjacent stanchions. The stanchions 90 each comprise a short wall segment and extend a small arcuate distance around the periphery of the end cap, and project primarily axially between the body portion and the sealing ring, although they also can have a slight outward taper, depending on the dimensions and location of the sealing ring. The stanchions are equally spaced about the periphery of the body portion 66; however, the number and locations of the stanchions can vary, depending on the desired fluid flow and required support for the sealing ring.

A flow device is provided along the upper surface 72 of the annular body portion 66 to direct fluid in a spiral or helical manner across the surface. To this end, at least one, and preferably a pair of substantially parallel, non-radial flow members as at 94a and 94b, extend from each stanchion 90 along the outer surface 69 of the annular body portion 66 to the inner annular flange 74 bounding the central opening 68. The flow members 94a, 94b redirect flow received axially against the annular body portion in a radially outward direction through the flow openings 92 in a swirling manner. The flow members are each illustrated as being relatively flat, blade-like members, spaced equally apart from one another, fixed along one edge to upper surface 69, and parallel with the central axis of the element, that is, perpendicular to the upper surface 69 of the body portion. The flow member pairs are preferably equally-spaced from adjacent pairs around the surface of the end cap. The adjacent flow members 94a, 94b, are spaced slightly apart from each other, and have a wedge shape, that is, they taper from a higher end attached to the stanchion 90, to a lower end attached to the central annular flange 74. The flow member pairs define non-radial flow paths along the outer surface of the end cap, which cause the fluid to flow outwardly in a spiral or helical manner. In a broader sense, the flow members can each be any sort of geometry (ribs, fins, channels, etc) in the upper end cap that causes the flow to be directed in a non-radial manner across the surface of the body portion, and out through the flow openings so that the flow is then directed downwardly along the exterior of the element in a non-axial (e.g., swirling) manner. The flow members could extend only a short distance radially along the upper surface, or could even be formed entirely or substantially entirely in the area of the flow openings (e.g., the flow openings could be angled or slanted in a circumferential direction to cause flow in a spiral or helical manner down around the periphery of the element).

The upper end cap 60, including body portion 66, sealing ring 80, stanchions 90, and central annular flange 74, is preferably formed as an integral piece, and preferably as a single, unitary piece, using appropriate techniques known in the art, such as molding. The seals are then attached to the end cap after its initial forming, and prior to the end cap being bonded to the media end.

Referring again to FIG. 1, the second (lower) end cap 60 for the filter element also has a U-shaped configuration in cross-section, and includes an annular body portion 98 defining a circular opening 100 around the central axis, sealingly bonded to the second end of the media ring. End cap 60 carries an inner resilient (preferably elastomeric) seal 102 for sealing against the outer surface of the cylindrical post 48 of the end cap 44. Seal 102 is captured in a radial groove formed between an inner surface of the body portion 98, and an outer surface of inner annular member 104, which forms a skirt and extends axially upward a short distance along the inner surface of the media. An outer annular skirt 106 also extends a short distance upwardly along the outer surface of the element.

When the element is installed within the casing 14 and the head 18 is attached (as shown in e.g., FIG. 1), fluid entering inlet passage 20 flows downwardly and axially against the upper surface 69 of the upper end cap 60. The flow members 94a, 94b direct the fluid in a spiral or helical manner outwardly along the surface of the end cap, and through the radial flow openings 92 between the stanchions 90. The fluid then passes downwardly, in a swirling (spiral or helical) manner, along the outer periphery of the element, between the element and casing. This non-axial flow configuration results in an improved, even distribution of fluid and contaminants along the media. The fluid then flows radially inward through the media, where the particles and other contaminants are removed. The "clean" fluid then passes through perforated tube 50, then travels upwardly, and axially out through the central post 32 and the outlet passage 22 in the filter head to the fluid system. Again, the filter element of the present invention is particularly useful for removing particles and other contaminants from a hydraulic fluid or a lubricating oil stream; however it should be appreciated that the present invention is useful for a variety of liquids and other fluids in many applications.

When the element eventually becomes clogged, and the pressure across the element increases above a pre-set threshold level, the valve assembly 26 opens to allow continued flow of fluid to bypass the element. When the element is to be replaced, the casing is unscrewed and removed from the head, and the filter element easily accessed and removed and replaced. The components can then be reassembled for continued use.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
a ring of filtration media circumscribing a central axis and having first and second ends;
first and second end caps at the first and second ends, respectively, of the media ring;
the first end cap including i) an annular body portion defining a central opening around the central axis, and sealingly bonded to the first end of the media ring, ii) an annular sealing ring having an annular, peripheral, resilient sealing portion; and iii) axial support stanchions spaced around the periphery of the body portion and extending between the body portion and the sealing ring and supporting the sealing ring at a location spaced apart from the body portion, the support stanchions defining radial flow openings between adjacent stanchions, and a non-radial flow member extending from each stanchion along an outer surface of the annular body portion to the central opening to define non-radial flow paths along the outer surface of the body portion in fluid communication with the flow openings, wherein the flow members direct flow received against the annular body portion of the first end cap outwardly across the first end cap and through the flow openings in a non-radial manner.

2. The filter element as in claim 1, wherein a first resilient seal inwardly bounds the central opening in the annular body portion of the first end cap.

3. The filter element as in claim 2, wherein a second resilient seal outwardly bounds the periphery of the sealing ring.

4. The filter element as in claim 1, wherein a pair of parallel, non-radial flow members project inwardly from each stanchion to the central opening in the annular body portion.

5. The filter element as in claim 4, wherein the flow members each comprise flat, wedge-shaped segments, oriented parallel to the central axis, and axially tapering from an enlarged end connected to a respective stanchion, to a narrow end surrounding the central opening in the annular body portion of the first end cap.

6. The filter element as in claim 5, further including an annular flange bounding the central opening in the first end cap, and projecting axially outward, away therefrom, and the flow members each project from one end connected to a respective stanchion at the periphery of the annular body portion, to another end connected to the annular flange.

7. The filter element as in claim 6, wherein the non-radial flow members are formed in one piece with a respective stanchion, the annual body portion, and the annular flange.

8. The filter element as in claim 1, wherein the stanchions each include a flat, imperforate wall segment extending arcuately along a portion of the first end cap.

9. The filter element as in claim 1, wherein the flow members each have a spiral or helical configuration across the outer surface of the annular body portion.

10. A filter element, comprising:
a ring of filtration media circumscribing a central axis and having first and second ends;
first and second end caps attached to respective first and second ends of the media ring;
the first end cap including i) an annular body portion defining a central opening around the central axis, and sealingly bonded to the first end of the media ring, ii) an annular sealing ring having an annular, peripheral, resilient sealing portion; and iii) support members extending between the body portion and the sealing ring and supporting the sealing ring at a location apart from the body portion, radial flow openings between the support members, and non-radial flow members across a major portion of the annular body portion to define non-radial flow paths along an outer surface of the body portion, the non-radial flow paths in fluid communication with the flow openings, wherein the flow members direct flow received against the annular body portion of the first end cap in a spiral or helical manner across the first end cap.

11. The filter element as in claim 10, wherein a first resilient seal inwardly bounds the central opening in the annular body portion of the first end cap.

12. The filter element as in claim 11, wherein a second resilient seal outwardly bounds the periphery of the sealing ring.

13. The filter element as in claim 10, wherein the non-radial flow members comprise parallel flow member pairs projecting across the outer surface of the body portion.

14. The filter element as in claim 10, wherein the flow members each comprise flat wedge-shaped segments, oriented parallel to the central axis, and axially tapering from an enlarged end connected to a stanchion, to a narrow end surrounding the central opening in the annular body portion of the first end cap.

15. The filter element as in claim 10, wherein the non-radial flow members are formed in one piece with the annular body portion.

16. The filter element as in claim 10, wherein the flow members each have a helical or spiral configuration, to define swirling flow paths along the outer surface of the body portion.

17. A filter element, comprising:
a ring of filtration media circumscribing a central axis and having first and second ends;
first and second end caps attached to respective first and second ends of the media ring;
the first end cap including i) an annular body portion defining a central opening around the central axis, and sealingly bonded to the first end of the media ring, ii) an annular sealing ring having an annular, peripheral, resilient sealing portion and supported apart from the annular body portion; and iii) a series of support members extending between the body portion and the sealing ring and defining flow openings between the support members, and the first end cap including non-radial flow directing means in fluid communication with the flow openings, for directing flow received against the annular body portion of the first end cap in a swirling manner across the first end cap.

18. The filter element as in claim 17, wherein a first resilient seal inwardly bounds the central opening in the annular body portion of the first end cap.

19. The filter element as in claim 18, wherein a second resilient seal outwardly bounds the periphery of the sealing ring.

20. The filter element as in claim 17, further including an annular flange bounding the central opening in the first end cap, and projecting axially outward, away therefrom, and the flow directing means comprises a series of non-radial flow members that project from one end connected to a respective support member at the peripheral edge of the annular body portion, to another end connected to the annular flange.

21. The filter element as in claim 17, wherein the flow directing means defines swirling flow paths along an outer surface of the body portion.

* * * * *